US008807526B2

(12) United States Patent
Kim

(10) Patent No.: US 8,807,526 B2
(45) Date of Patent: Aug. 19, 2014

(54) BUTTERFLY VALVE HAVING MOVING DISC

(75) Inventor: Man Young Kim, Gyeonggi-Do (KR)

(73) Assignee: Seokwang Mfg Co., Ltd. (KR)

( * ) Notice: Subject to any disclaimer, the term of this patent is extended or adjusted under 35 U.S.C. 154(b) by 234 days.

(21) Appl. No.: 13/351,278

(22) Filed: Jan. 17, 2012

(65) Prior Publication Data

US 2013/0026403 A1 Jan. 31, 2013

(30) Foreign Application Priority Data

Jul. 26, 2011 (KR) .................. 10-2011-0074266

(51) Int. Cl.
*F16K 25/00* (2006.01)
*F16K 1/22* (2006.01)

(52) U.S. Cl.
USPC .................. 251/160; 251/167; 251/305

(58) Field of Classification Search
CPC ............. F16K 1/24; F16K 1/22; F16K 5/204
USPC ......... 251/305, 160, 162, 167, 192, 203, 279, 251/286–288; 137/613
See application file for complete search history.

(56) References Cited

U.S. PATENT DOCUMENTS

| 2,290,332 | A | * | 7/1942 | Johnson | 251/160 |
|---|---|---|---|---|---|
| 2,696,968 | A | * | 12/1954 | De Fillips Paul | 251/192 |
| 3,065,950 | A | * | 11/1962 | Goldberg | 251/160 |
| 3,406,943 | A | * | 10/1968 | Newell | 251/163 |
| 3,669,405 | A | * | 6/1972 | Baum | 251/279 |
| 3,854,696 | A | * | 12/1974 | Keyes et al. | 251/163 |
| 4,206,903 | A | * | 6/1980 | Scaramucci | 251/174 |
| 4,223,867 | A | * | 9/1980 | Niino et al. | 251/62 |
| 4,328,947 | A | * | 5/1982 | Reimpell et al. | 251/80 |
| 4,482,128 | A | * | 11/1984 | Boeckman et al. | 251/163 |
| 4,815,693 | A | * | 3/1989 | James et al. | 251/14 |
| 4,921,212 | A | * | 5/1990 | deQuay | 251/163 |
| 4,940,210 | A | * | 7/1990 | Gilmore | 251/160 |
| 5,957,428 | A | * | 9/1999 | Yokota | 251/305 |
| 6,042,083 | A | * | 3/2000 | Lee | 251/161 |
| 2005/0127317 | A1 | * | 6/2005 | Rebello | 251/209 |

FOREIGN PATENT DOCUMENTS

| KR | 1020050099172 | 10/2005 |
|---|---|---|
| KR | 10-0992084 | 11/2010 |

OTHER PUBLICATIONS

Office Action received from the Korean Patent Office dated Dec. 13, 2011 for corresponding Korean application No. 10-2011-0074266.

* cited by examiner

*Primary Examiner* — Eric Keasel
*Assistant Examiner* — David Colon Morales
(74) *Attorney, Agent, or Firm* — Ostrolenk Faber LLP

(57) ABSTRACT

Disclosed is a butterfly valve capable of controlling fluid flow according to rotation of a disc. The butterfly valve includes a valve body having an inner space of which two end portions are open; first and second discs disposed to face each other at the inner space, installed to be rotatable between an open state and a closed state of the inner space, and configured to selectively open and close the inner space; first and second sealing members mounted to the valve body, and configured to contact the first and second discs, respectively in the closed state; and a disc controlling apparatus configured to move the first and second discs to a direction contacting to or spacing from the first and second sealing members in the closed state. Under this configuration, durability and a sealing function may be enhanced.

11 Claims, 11 Drawing Sheets

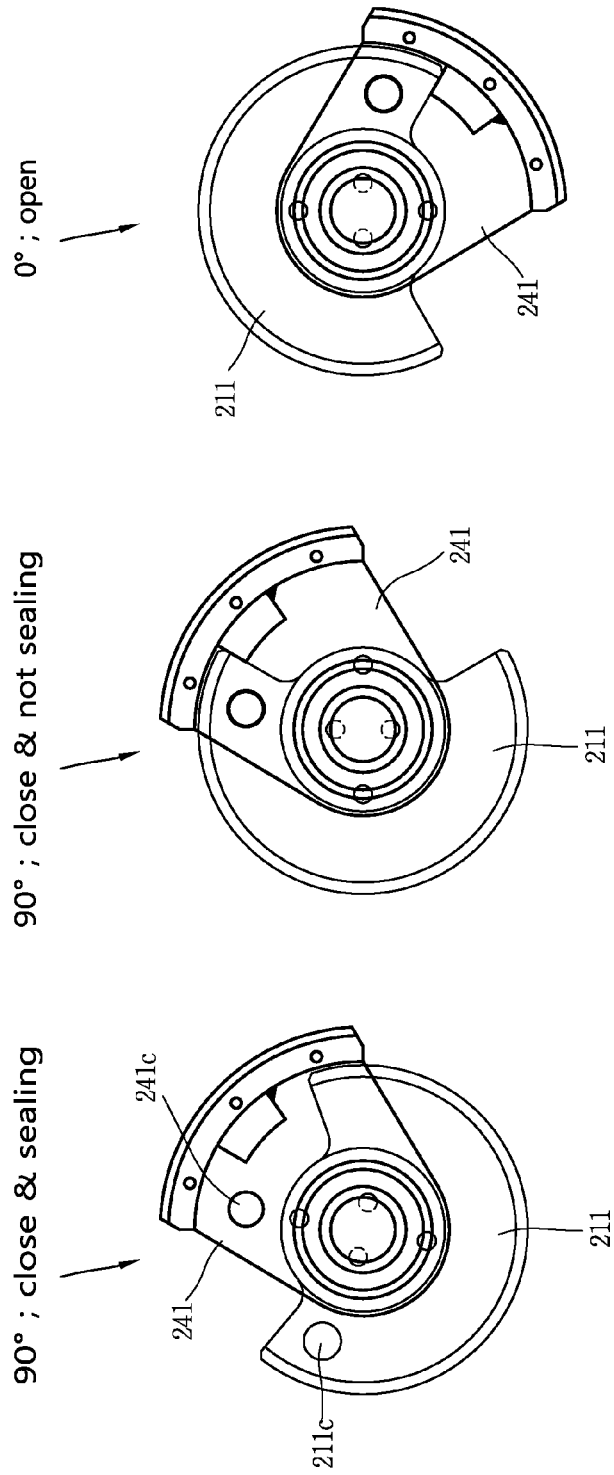

BUTTERFLY VALVE HAVING MOVING DISC

CROSS-REFERENCE TO RELATED APPLICATIONS

Pursuant to 35 U.S.C. §119(a), this application claims the benefit of earlier filing date and right of priority to Korean Application No. 10-2011-0074266, filed on Jul. 26, 2011, the contents of which is incorporated by reference herein in its entirety.

BACKGROUND OF THE INVENTION

1. Field of the Invention

This specification relates to a butterfly valve, and particularly, to a butterfly valve capable of controlling fluid flow according to rotation of a disc disposed in a valve.

2. Background of the Invention

Generally, valves are installed at part of a piping system formed by pipes, etc. which form a fluid path, and serve to control fluid flow to be stopped or to be maintained.

A type of the valves, a butterfly valve is configured to open and close a flow passage according to a rotation of a disc installed in a valve body. More concretely, a sealing member is disposed to block a gap between an opening/closing member (disc) and a housing, so as to prevent a fluid from leaking to the gap in a state that fluid flow has stopped.

The sealing member is installed at the housing with a contacted state to the opening/closing member with an initially-set pressure. However, while the disc is rotated, the disc and the sealing member come in contact with each other. The disc or the sealing member may be abraded due to repeated contacts therebetween.

Accordingly, may be considered a method for preventing interference due to contact between the disc and the sealing member.

SUMMARY OF THE INVENTION

Therefore, an aspect of the detailed description is to provide a butterfly valve capable of maintaining a completely-sealed state, and capable of preventing interference between a disc and a sealing member when a flow passage is open and closed.

Another aspect of the detailed description is to provide a butterfly valve capable of having a simplified structure, a sealing control function, and an enhanced reliability.

To achieve these and other advantages and in accordance with the purpose of this specification, as embodied and broadly described herein, there is provided a butterfly valve comprising: a valve body having an inner space of which two end portions are open; first and second discs disposed to face each other at the inner space, installed to be rotatable between an open state and a closed state of the inner space, and configured to selectively open and close the inner space; first and second sealing members mounted to the valve body, and configured to contact the first and second discs, respectively in the closed state; and a disc controlling apparatus configured to move the first and second discs to a direction contacting to or spacing from the first and second sealing members in the closed state.

The disc controlling apparatus may include a shaft, a driving module and a motion conversion assembly. The shaft may be disposed between the first and second discs, and the driving module may be configured to supply power to the shaft such that the shaft rotates. The motion conversion assembly may be connected to the first and second discs, respectively, and may be configured to convert a rotary motion of the shaft into a linear motion of the first and second discs in the closed state.

The motion conversion assembly may include a guide member and a guide rail. The guide member may be screw-connected to the shaft so as to perform a linear motion according to rotation of the shaft. And, the guide rail may be disposed on at least one of the first and second discs, and configured to guide a linear motion of the guide member.

The guide rail may be formed to be inclined in a lengthwise direction of the shaft such that the first and second discs move in a direction perpendicular to a moving direction of the guide member.

The guide member may include first and second guide members spacing from each other in a lengthwise direction of the shaft, and the first and second guide members may be connected to the shaft by threads of a left screw and a right screw, respectively.

According to another embodiment of the present invention, the disc controlling apparatus may be formed to move the first and second discs to a direction spacing from each other or approaching to each other in the closed state. The first and second sealing members may be disposed to face each other in a state that the first and second discs are interposed therebetween.

According to still another embodiment of the present invention, the disc controlling apparatus may include a rotation assembly. The rotation assembly may be configured to rotate the first and second discs together between the open state and the closed state.

The rotation assembly may be configured to transmit a rotational force of the shaft to the first and second discs between the open state and the closed state, and to stop the rotational force of the shaft from being transmitted in the closed state.

The rotation assembly may include a rotation member, a rotation transmission module and a connection member. The rotation member may be provided with a hollow portion for accommodating the shaft therein, and the rotation transmission module may be configured to selectively transmit a rotational force of the shaft to the rotation member. The connection member may be coupled to the rotation member, and may be connected to the first and second discs so as to be rotated together with the first and second discs.

A wheel interworked with the rotation member may be mounted to the shaft. The rotation transmission module may include a clutch configured to transmit a rotational force between the wheel and the rotation member, or to stop the rotational force from being transmitted. Alternatively, the rotation transmission module may include a linkage configured to connect the wheel and the rotation member to each other such that the rotation member is selectively pulled by rotation of the shaft.

The rotation transmission module may include a link guide configured to guide the linkage between the open state and the closed state.

The rotation assembly may include a stopper. The stopper may be configured to restrict a rotation of the rotation member when the first and second discs are rotated to the closed state from the open state.

According to another aspect of the present invention, there is provided a butterfly valve comprising: a valve body having a flow passage; first and second discs disposed to face each other on the flow passage, installed to be rotatable between an open state and a closed state of the flow passage, and configured to selectively open and close the flow passage; a first sealing member mounted to the valve body, and formed in correspondence to the first disc; a second sealing member formed in correspondence to the second disc, and disposed to face the first disc in a state that the first and seconds are interposed therebetween; and a disc controlling apparatus configured to rotate together or linearly-move the first and second discs, so as to prevent interference between the first disc and the first sealing member and interference between the second disc and the second sealing member when the flow passage is open and closed.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIGS. 5A and 5B are views each illustrating an operation of the rotation assembly of FIG. 2;

DETAILED DESCRIPTION OF THE INVENTION

Figure 1:
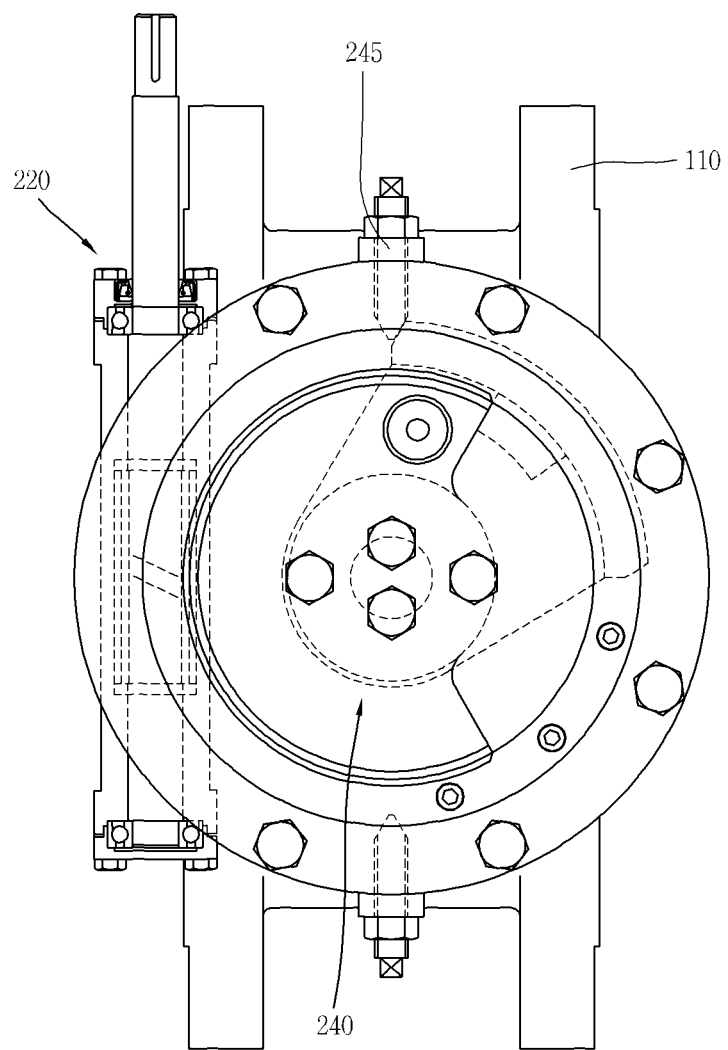
FIG. 1 is a planar view of a butterfly valve according to one embodiment of the present invention.

Description will now be given in detail of the exemplary embodiments, with reference to the accompanying drawings. For the sake of brief description with reference to the drawings, the same or equivalent components will be provided with the same reference numbers, and description thereof will not be repeated.

Hereinafter, a butterfly valve having a moving disc according to the present invention will be explained in more details with reference to the attached drawings. The same or similar reference numerals will be given to the same or similar parts in different embodiments, and their detailed explanation will be omitted. The singular expression used in the specification of the present invention may include the meaning of plurality unless otherwise defined.

Figure 2:
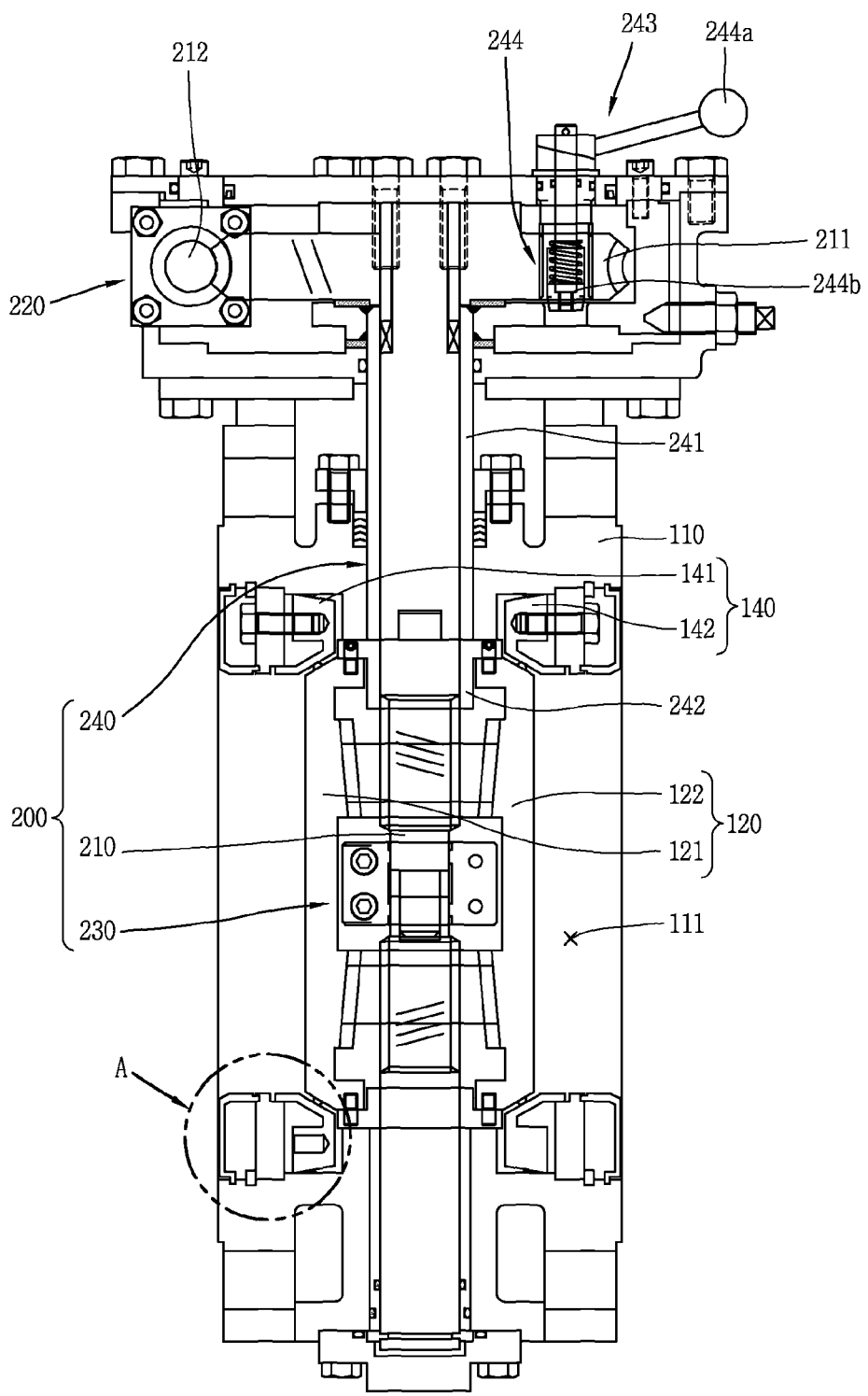
FIG. 2 is a side sectional view of the butterfly valve of FIG. 1.

FIG. 1 is a planar view of a butterfly valve according to one embodiment of the present invention, and FIG. 2 is a side sectional view of the butterfly valve of FIG. 1.

Referring to FIGS. 1 and 2, a valve body 110 of the butterfly valve has a connectable structure between pipes. A fluid may flow through an inner space 111 (refer to FIG. 2) of the cylindrical valve body 110. More concretely, the inner space 111 forms a flow passage through which a fluid flows, and both end portions of the valve body 110 are open to consecutively extend the flow passage. At a lower part of the valve body 110, may be installed a supporting plate configured to support the valve body 110 when the butterfly valve is installed on the ground, etc.

A disc 120 configured to open and close the flow passage is installed at the inner space 111. The disc 120 is rotatably mounted to the valve body 110, and is configured to open and close the flow passage by being rotated.

As shown in FIG. 2, the disc 120 is rotated when the flow passage is in a closed state (blocked state) to open the flow passage. In order to completely open the flow passage, the disc 120 has to be rotated by about 90° in FIG. 2.

A sealing member 140 is mounted to an inner circumferential surface of the valve body 110 which forms the inner space 111, thereby sealing a gap between the disc 120 and the inner circumferential surface of the valve body 110. More concretely, in the closed state, the sealing member 140 is disposed on the inner circumferential surface of the valve body 110 with contacting the disc 120. Under this configuration, the sealing member 140 may prevent or reduce a fluid from leaking through a gap between the valve body 110 and the disc 120. The butterfly valve of the present invention comprises a disc controlling apparatus 200. The disc controlling apparatus 200 is configured to move the disc 120 to a direction contacting to or spacing from the sealing member 140 in the closed state.

Through the mechanism to linearly-move and rotate the disc, may be prevented interference between the disc 120 and the sealing member 140 when the flow passage of the valve body 110 is open and closed.

Figure 3:
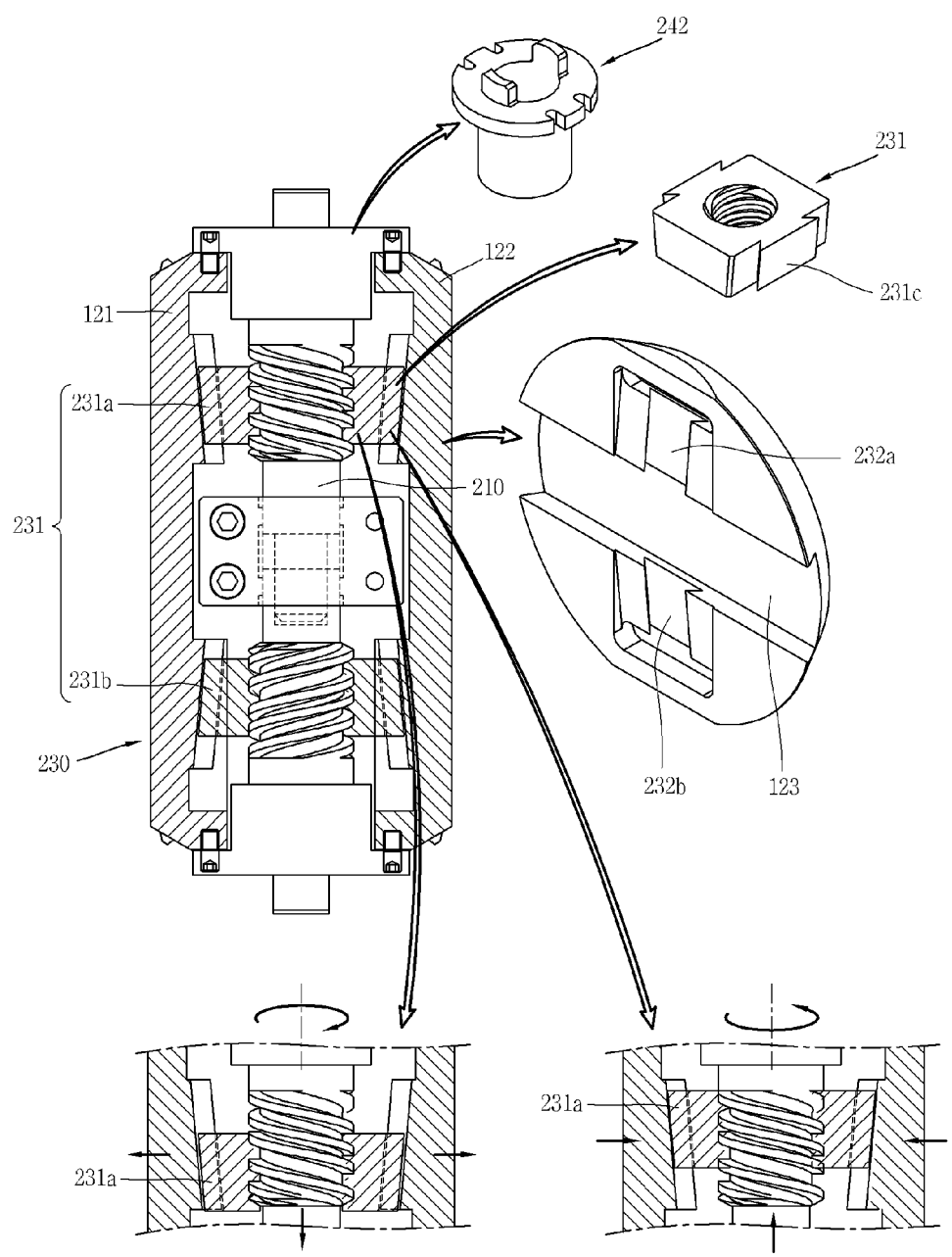
FIG. 3 is an enlarged view of a motion conversion assembly of FIG. 2.
Figure 4A:
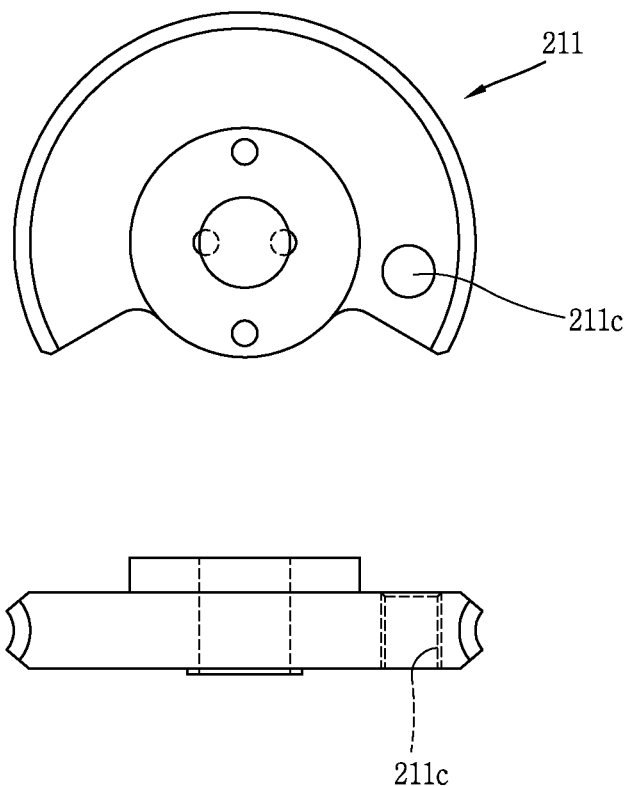
FIGS. 4A and 4B are enlarged views of a rotation member and a wheel of FIG. 2, respectively.
Figure 4B:
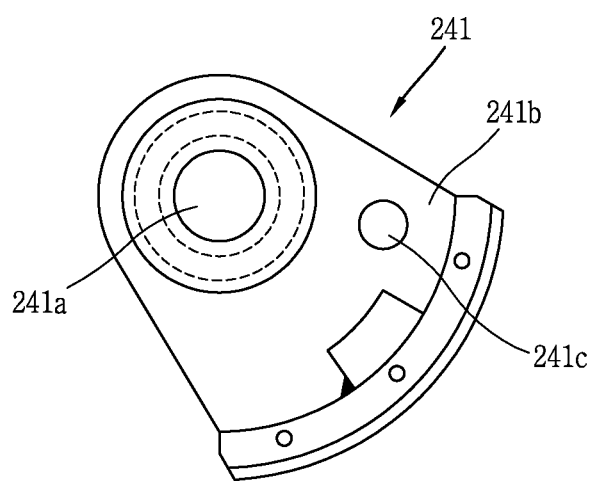
Figure 4B:
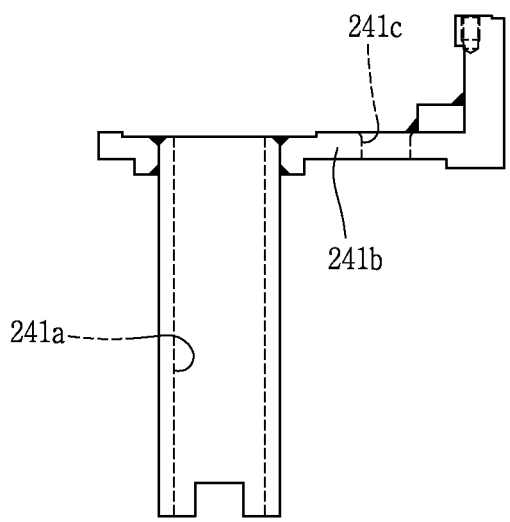
Figure 5A:
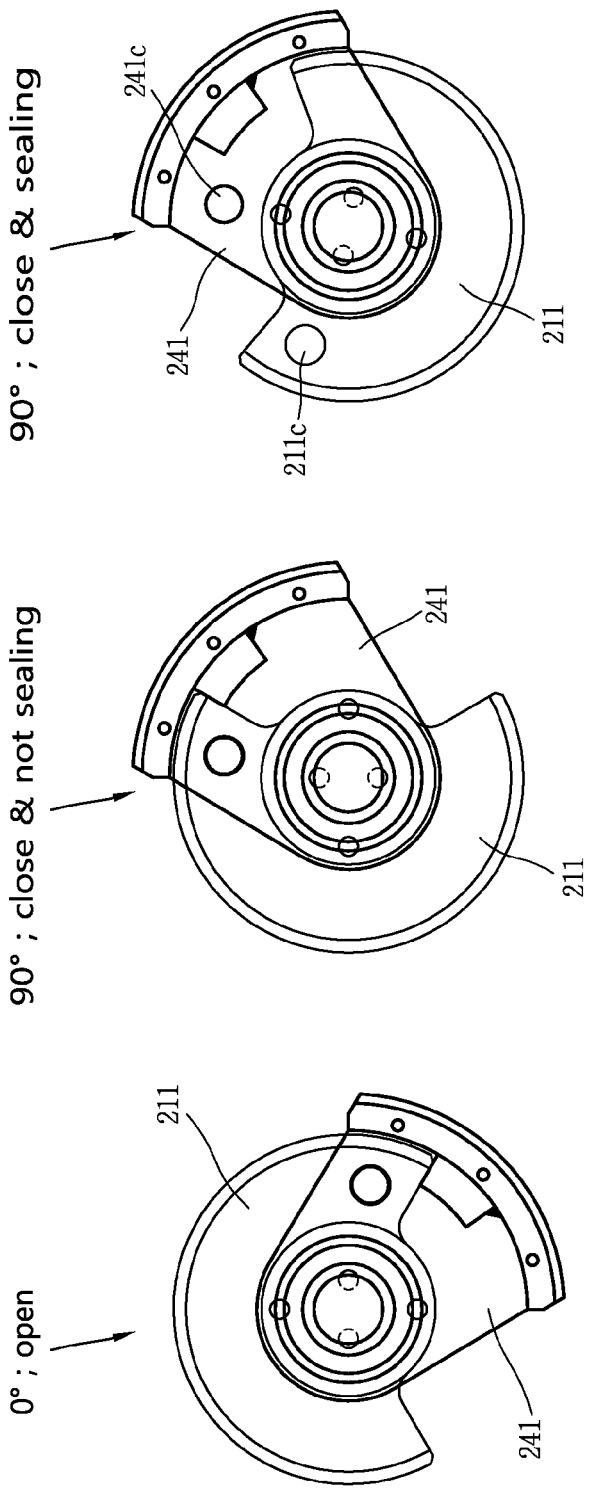

Hereinafter, the mechanism to linearly-move and rotate the disc will be explained in more details with reference to FIGS. 1 to 5B. FIG. 3 is an enlarged view of a motion conversion assembly of FIG. 2, FIGS. 4A and 4B are enlarged views of a rotation member and a wheel of FIG. 2, respectively, and FIGS. 5A and 5B are views each illustrating an operation of the rotation assembly of FIG. 2.

Referring to FIGS. 1 to 3, first and second discs 121 and 122 are disposed to face each other at the inner space 111 of the valve body 110. The first and second discs 121 and 122 are installed to be rotatable between an open state and a closed state of the inner space 111, and are configured to selectively open and close the inner space 111.

The sealing member 140 is formed in a ring shape, and includes first and second sealing members 141 and 142 corresponding to the first and second discs 121 and 122. The first and second sealing members 141 and 142 are disposed to face each other in a state that the first and second discs 121 and 122 are interposed therebetween. That is, in the closed state, the first sealing member 141 faces the first disc and the second sealing member 142 faces the second disc 122.

Under control of the disc controlling apparatus 200, the first and second discs 121 and 122 are together rotated, or simultaneously linearly-moved to a direction contacting to or spacing from the sealing member 140. The disc controlling apparatus 200 prevents interference between the first disc 121 and the first sealing member 141 and interference between the second disc 122 and the second sealing member 142 when the flow passage of the valve is open and closed. This may allow the disc controlling apparatus 200 to control the first and second discs 121 and 122 to be rotated together, or to be linearly-moved simultaneously.

More concretely, the disc controlling apparatus 200 is configured to rotate the first and second discs 121 and 122 between the open state and the closed state, and is configured to move the first and second discs 121 and 122 to a direction contacting to or spacing from each other in the closed state.

The disc controlling apparatus 200 includes a shaft 210, a driving module 220, a motion conversion assembly 230 and a rotation assembly 240.

The shaft 210 is disposed between the first and second discs 121 and 122, and is arranged in a direction crossing a fluid path direction in the valve body 110. As a rotational force of the shaft 210 is transmitted to the first and second discs 121 and 122, the first and second discs 121 and 122 are rotated.

The driving module 220 supplies power to the shaft 210 so that the shaft 210 is rotated. More concretely, a wheel, e.g., a worm wheel 211 is mounted to an end portion of the shaft 210. A rotational force of a worm 212 corresponding to the worm wheel 211 is transmitted to the shaft 210 via the worm wheel 211.

When the first and second discs 121 and 122 rotates to a closed state from an open state, the disc controlling apparatus 200 linearly-moves the first and second discs 121 and 122 by using rotation of the shaft 210. This operation is implemented by the motion conversion assembly 230 and the rotation assembly 240.

The motion conversion assembly 230 is connected to the first and second discs 121 and 122, respectively, and is configured to convert a rotary motion of the shaft 210 into a linear-motion of the first and second discs 121 and 122.

More concretely, the motion conversion assembly 230 includes a guide member 231 and a guide rail 232.

The guide member 231 is screw-connected to the shaft 210 so as to be linearly-moved by rotation of the shaft 210. For instance, a screw hole is formed on one surface of the guide member 231, and dovetails 231c are formed on side surfaces of the guide member 231 crossing the one surface.

The guide member 231 includes first and second guide members 231a and 231b spacing from each other in a lengthwise direction of the shaft 210. The first and second guide members 231a and 231b are connected to the shaft 210 by threads of a left screw and a right screw, respectively. More concretely, when a screw hole of the first guide member 231a is connected to the shaft 210 by a left screw, a screw hole of the second guide member 231b is connected to the shaft 210 by a right screw, or vice versa.

Under the configuration, once the shaft 210 rotates, the first and second guide members 231a and 231b move to approach to or be spaced from the shaft 210.

The guide rail 232 is arranged on at least one of the first and second discs 121 and 122, thereby guiding a linear motion of the guide member 231. As shown in FIGS. 2 and 3, each of the first and second discs 121 and 122 is provided with an accommodation recess 123 for accommodating the shaft 210 therein. Guide rails 232a and 232b corresponding to the dovetails 231a are formed at both sides of the accommodation recess 123.

The guide rails 232a and 232b are formed to be inclined in a lengthwise direction of the shaft 210 so that the first and second discs 121 and 122 move in a direction perpendicular to a moving direction of the guide member 231. And, outer surfaces of the dovetails 231c are also formed to be inclined.

Once the dovetails 231 move in a state that bottom portions of the guide rails 232a and 232b come in contact with the outer surfaces of the dovetails 231c, a force is applied to the guide rails 232a and 232b in a direction perpendicular to a moving direction of the guide member 231. This may allow the first and second discs 121 and 122 to be linearly-moved.

Once the first and second discs 121 and 122 move to a direction spacing from each other, a closed state is converted into a sealing state. On the other hand, once the first and second discs 121 and 122 move to a direction contacting to each other, the sealed state is converted into the closed state. Here, the sealing state indicates a closely-adhered state between the disc 120 and the sealing member.

Through the linear-motion mechanism where the guide rails of the discs facing each other are inclined in a lengthwise direction of the shaft and the plurality of guide members move in opposite directions along the shaft, may be prevented abrasion of the plurality of discs and the sealing member due to contact therebetween. Furthermore, through the mechanism, a motion amount of the discs is controlled to simply control a sealing degree between the sealing member and the discs.

Hereinafter, the rotation assembly 240 will be explained with reference to FIGS. 2 to 5B.

The rotation assembly 240 is configured to rotate the first and second discs 121 and 122 together between an open state and a closed state of a flow passage by the disc 120. More concretely, the rotation assembly 240 is configured to transmit a rotational force of the shaft 210 to the first and second discs 121 and 122 between the open state and the closed state, and to stop the rotational force of the shaft 210 from being transmitted in the closed state. Furthermore, when the linear-motion mechanism is operated, the rotation assembly 240 prevents a rotational force of the shaft 210 from being transmitted to the disc 120.

Referring to FIGS. 2 to 5B, the rotation assembly 240 includes a rotation member 241, a connection member 242 and a rotation transmission module 243.

A hollow portion 241a for accommodating the shaft 210 therein is formed at a body of the rotation member 241. A rotation plate 241b overlapping the worm wheel 211 is formed at one end of the rotation member 241.

The connection member 242 is coupled to another end of the rotation member 241. The connection member 242 is configured to accommodate the shaft 210 therein, and is connected to the first and second discs 121 and 122 so as to be rotated together with the first and second discs 121 and 122.

The rotation transmission module 243 is configured to selectively transmit a rotational force of the shaft 210 to the rotation member 241.

The rotation transmission module 243 includes a clutch 244. The clutch 244 is configured to transmit a rotational force between the worm wheel 211 and the rotation member 241, or is configured to stop the rotational force from being transmitted. For instance, the clutch 244 is provided with a lever 244a manipulated by a user, and a pin 244b moveable by the lever 244a and connecting or disconnecting the worm wheel 211 and the rotation member 241 to each other or from each other. Pin holes 211c and 241c configured to insert the pin 244b are formed at the worm wheel 211 and the rotation member 241, respectively.

Hereinafter, an interworking operation among the rotation member 241, the shaft 210 and the worm wheel 211 will be explained in more details with reference to FIGS. 5A and 5B.

Referring to FIG. 5A, once the lever 244a (refer to FIG. 1) is downward moved in an open state, the rotation member 241 and the worm wheel 211 are connected to each other. If the shaft 210 rotates, the rotation member 241 and the connection member 242 are rotated, and the first and second discs 121 and 122 (refer to FIG. 2) coupled to the connection member 242 are rotated.

When the lever 244a is upward moved in a state that the first and second discs 121 and 122 have rotated by about 90° (closed state), the connected state between the rotation member 241 and the worm wheel 211 is released. If the shaft 210 rotates, the worm wheel 211 is rotated but the rotation member 241 is stopped. Under this configuration, the linear-motion mechanism of the first and second discs 121 and 122 is implemented, and the first and second discs 121 and 122 move to a sealing state from a closed state.

Referring to FIG. 5B, a sealing state, a closed state and an open state may be sequentially implemented by reversely executing the operations shown in FIG. 5A with reversely rotating the shaft.

Referring to FIG. 1 back, the rotation assembly 240 includes a stopper 245.

The stopper 245 is configured to restrict rotation of the rotation member 241 when the first and second discs 121 and 122 have rotated to a closed state from an open state. For instance, the stopper 245 is mounted to the valve body 110, and is protruding so as to contact the rotation member 241 being rotated. In this case, the worm wheel 211 is formed to have a diameter smaller than that of the rotation member 241 so that the stopper 245 does not restrict rotation of the worm wheel 211.

The stopper 245 is formed to have an inclined end portion (sharp end portion), and is configured to be moveable toward the center of the rotation member 241. Under this configuration, a stopping position of the rotation member 241 may be minutely controlled.

Figure 6:
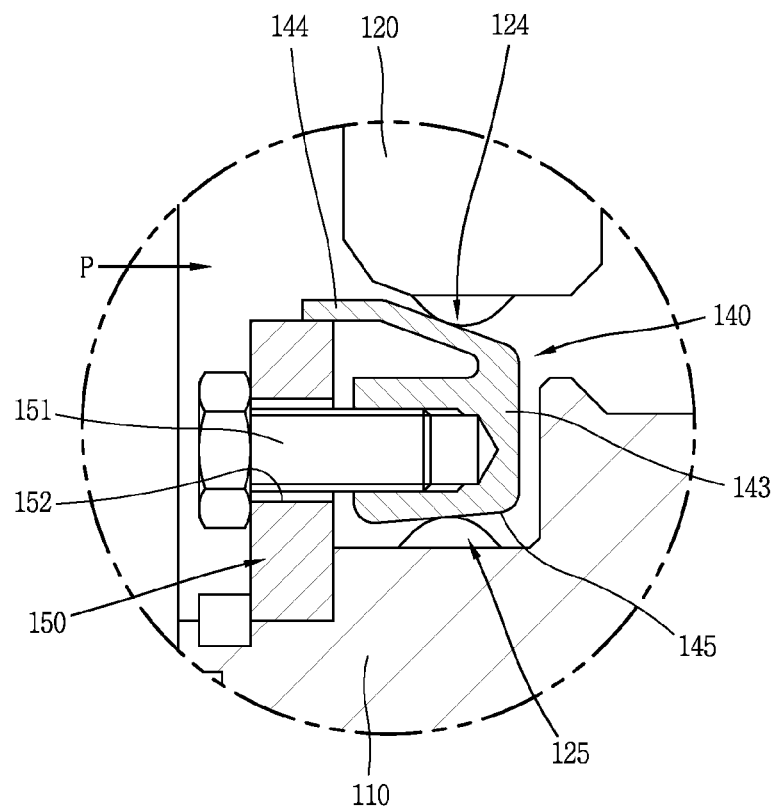
FIG. 6 is an enlarged sectional view of part 'A' in FIG. 2.

Hereinafter, a detailed structure of the sealing member 140 will be explained with reference to FIG. 6. FIG. 6 is an enlarged sectional view of part 'A' in FIG. 2.

Referring to FIG. 6, a first seat portion 124 is protruding from an outer circumferential surface of the disc 120. The first seat portion 124 is formed in a circumferential direction of the disc 120, and is configured to contact or be separated from the sealing member 140 according to rotation of the disc 120.

A second seat portion 125 is protruding from an inner circumferential surface of the valve body 110 at a position facing the first seat portion 124. The second seat portion 125 is formed in a circumferential direction of the valve body 110, and is configured to contact the sealing member 140 at a fixed position.

The first and second seat portions 124 and 125 may be formed of metal or rubber, etc. When being formed of metallic materials, the first and second seat portions 124 and 125 may be integrated with the disc 120 and the valve body 110. More concretely, each of the first and second seat portions 124 and 125 may be implemented as a metal sheet formed of a metallic material and fixed to the disc 120 and the valve body 110 by built-up welding.

The sealing member 140 includes a sealing body portion 143, a first contact portion 144 and a second contact portion 145.

The sealing body portion 143 constitutes a main body of a sealing member, and is formed of a metallic material, for instance. The sealing body portion 143 may be formed in a circular arc shape or a ring shape so as to be disposed in an inner circumferential direction of the valve body 110. The first and second contact portions 144 and 145 may be disposed at an inner circumferential side and an outer circumferential side of the circular arc shape or the ring shape, respectively.

The first and second contact portions 144 and 145 are inclined along a center line of a flow passage, and are formed to contact the first and second seat portions 124 and 125, respectively. The first and second contact portions 144 and 145 are formed to be inclined in opposite directions.

The sealing member 140 is configured to have a force to pressurize the disc 120 and variable according to a pressure of a fluid which flows at the inner space 111 of the valve body 110. When the fluid has a high pressure, the sealing member 140 pressurizes or contacts the disc 120 with a relatively greater force.

For instance, the first and second contact portions 144 and 145 are formed to be inclined toward a direction to pressurize the first and second seat portions 124 and 125 by a pressure (P) of the fluid which flows at the inner space 111 of the valve body 110. When the disc 120 is in a closed state, the first and second contact portions 144 and 145 are more fitted into a gap between the first and second seat portions 124 and 125, like a wedge, by a fluid pressure applied to the sealing member 140. This may implement a mechanism for preventing water leakage more intensively when a high fluid pressure is applied.

The sealing member 140 is moveably mounted to a fixing portion 150. The fixing portion 150 is mounted to the valve body 110, and is formed in a ring shape. A control screw 151 of the fixing portion 150 is coupled to the sealing member 140 through the fixing portion 150 so as to control a contact amount of the sealing member 140 onto the first and second seat portions 124 and 125. A through hole 152 configured to pass the control screw 151 therethrough may be formed at the fixing portion 150.

Figure 7:
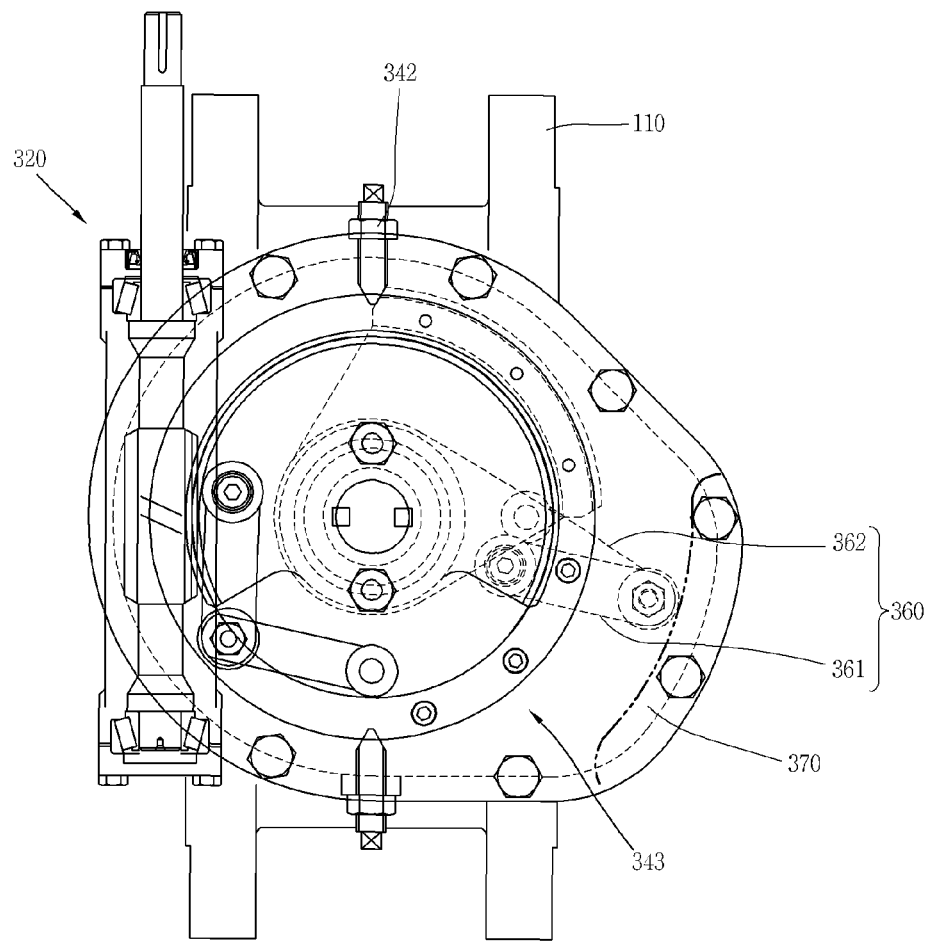
FIG. 7 is a planar view of a butterfly valve according to another embodiment of the present invention.
Figure 8:
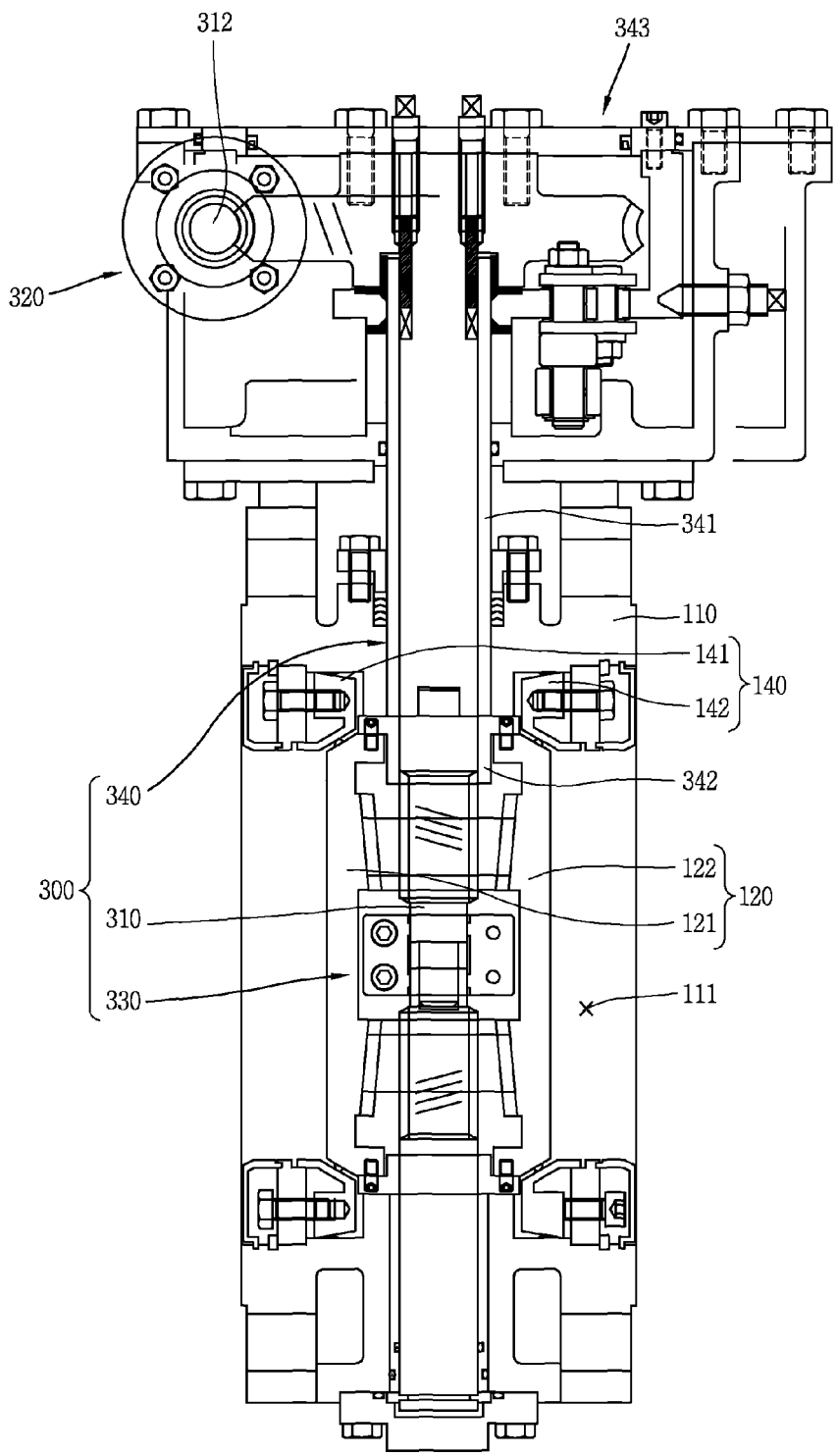
FIG. 8 is a side sectional view of the butterfly valve according to another embodiment of the present invention.
Figure 9:
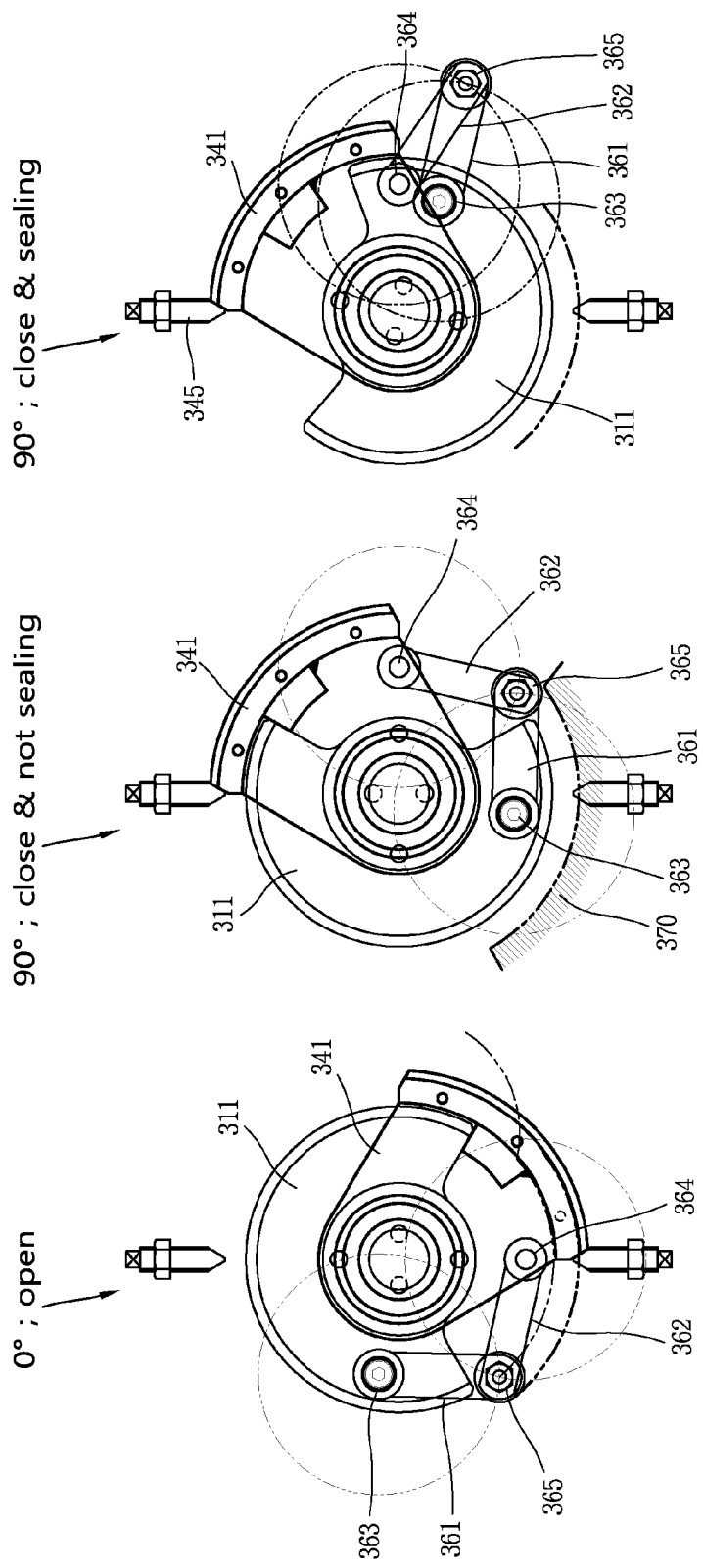
FIG. 9 is a view illustrating an operation of a rotation assembly of FIG. 7.

FIG. 7 is a planar view of a butterfly valve according to another embodiment of the present invention, FIG. 8 is a side sectional view of the butterfly valve according to another embodiment of the present invention, and FIG. 9 is a view illustrating an operation of a rotation assembly of FIG. 7. The same or similar configurations as or to those of the aforementioned embodiment will be provided with the same or similar reference numerals, and detailed explanations thereof will be omitted.

A rotation transmission module 343 includes a linkage 360 configured to connect a worm wheel 311 and a rotation member 341 so that the rotation member 341 is selectively pulled by rotation of a shaft 310.

For instance, a plurality of links 361 and 362 of the linkage 360 may be configured to connect the worm wheel 311 and the rotation member 341 to each other.

One end of the first link 361 may be rotatably mounted to a position eccentric from a rotation center of the worm wheel 311, and another end of the first link 361 is hinge-coupled to one end of the second link 362. Another end of the second link 362 is rotatably connected to a part adjacent to an outer circumference of the rotation member 341. A connection part 363 between the first link 361 and the worm wheel 311 is spacing from a connection part 364 between the second link 362 and the rotation member 341, in a rotation direction of the rotation member 341.

The rotation transmission module 343 may include a link guide 370. The link guide 370 may be mounted to the valve body 110 or a driving module 320. The link guide 370 is formed in a circular arc shape, and is configured to guide a connection part 365 between the first link 361 and the second link 362. And, the link guide 370 is formed to have a length long enough to guide the linkage 360 between an open state and a closed state.

When the shaft rotates more in a closed state, the connection part 365 between the first and second links 361 and 362 is out of the range of the link guide 370. And, the first and second links 361 and 362 rotate in opposite directions centering around the connection part 365. Once the first and second links 361 and 362 rotate in opposite directions, the worm wheel 311 may rotate in a state that the rotation member 341 is in a stopped state.

The butterfly valve according to the present invention may have the following advantages.

Firstly, the plurality of discs sequentially perform a linear-motion and a rotational motion when the flow passage is open and closed. This may prevent abrasion of the plurality of discs and the sealing member due to contact therebetween. This may allow a high sealing performance by the plurality of discs, and enhance durability.

Secondly, the guide rails of the disc facing each other are inclined in a lengthwise direction of the shaft and the plurality of guide members move in opposite directions along the shaft. This may implement a linear motion of the discs facing each other through a simple structure.

Thirdly, the metal seat for sealing is mounted on an inner circumferential surface of the valve body. This may not require an elastic sealing member (O-ring, etc.) formed of a non-metallic material and having a degraded sealing function as a temperature is increased. This may prevent water leakage due to a thermal deformation of the 0-ring, etc.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A rotating valve, comprising:
    a valve body having an inner space of which two end portions are open;
    first and second discs disposed to face each other at the inner space, installed to be rotatable between an open state and a closed state of the inner space, and configured to selectively open and close the inner space;
    first and second sealing members mounted to the valve body, and configured to contact the first and second discs, respectively in the closed state; and
    a disc controlling apparatus configured to move the first and second discs to a direction contacting to or spacing from the first and second sealing members in the closed state,
    wherein the disc controlling apparatus comprises:
    a shaft disposed between the first and second discs;
    a driving module configured to supply power to the shaft such that the shaft rotates; and
    a motion conversion assembly connected to the first and second discs, respectively, and configured to convert a rotary motion of the shaft into a linear motion of the first and second discs in the closed state,
    wherein the motion conversion assembly comprises:
    a guide member screw-connected to the shaft so as to perform a linear motion according to rotation of the shaft; and
    a guide rail disposed on at least one of the first and second discs, and configured to guide a linear motion of the guide member.

2. The rotating valve of claim 1, wherein the guide rail is formed to be inclined in a lengthwise direction of the shaft such that the first and second discs move in a direction perpendicular to a moving direction of the guide member.

3. The rotating valve of claim 1, wherein the guide member comprises first and second guide members spacing from each other in a lengthwise direction of the shaft,
    wherein the first and second guide members are connected to the shaft by threads of a left screw and a right screw, respectively.

4. The rotating valve of claim 1, wherein the disc controlling apparatus is formed to move the first and second discs to a direction spacing from each other or approaching to each other in the closed state.

5. The rotating valve of claim 1, wherein the first and second sealing members are disposed to face each other in a state that the first and second discs are interposed therebetween.

6. The rotating valve of claim 1, wherein the disc controlling apparatus further comprises a rotation assembly configured to rotate the first and second discs together between the open state and the closed state.

7. The rotating valve of claim 6, wherein a shaft which rotates by power is disposed between the first disc and the second disc,
    wherein the rotation assembly is configured to transmit a rotational force of the shaft to the first and second discs between the open state and the closed state, and to stop the rotational force of the shaft from being transmitted in the closed state.

8. The rotating valve of claim 7, wherein the rotation assembly comprises:
    a rotation member having a hollow portion for accommodating the shaft therein;
    a rotation transmission module configured to selectively transmit a rotational force of the shaft to the rotation member; and
    a connection member coupled to the rotation member, and connected to the first and second discs so as to be rotated together with the first and second discs.

9. The rotating valve of claim 8, wherein a wheel interworked with the rotation member is mounted to the shaft,
    wherein the rotation transmission module comprises a clutch configured to transmit a rotational force between the wheel and the rotation member, or to stop the rotational force from being transmitted, or
    wherein the rotation transmission module comprises a linkage configured to connect the wheel and the rotation member to each other such that the rotation member is selectively pulled by rotation of the shaft.

10. The rotating valve of claim 9, wherein the rotation transmission module further comprises a link guide configured to guide the linkage between the open state and the closed state.

11. The rotating valve of claim 8, wherein the rotation assembly further comprises a stopper configured to restrict a rotation of the rotation member when the first and second discs are rotated to the closed state from the open state.

* * * * *